US009385575B2

(12) United States Patent
Danforth, III et al.

(10) Patent No.: US 9,385,575 B2
(45) Date of Patent: Jul. 5, 2016

(54) COOLING AND CONTROL OF A LOAD BANK USED IN A POWER GENERATION SYSTEM

(71) Applicant: Kohler Co., Kohler, WI (US)

(72) Inventors: Robert J. Danforth, III, Sheboygan Falls, WI (US); Isaac S. Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 534 days.

(21) Appl. No.: 13/894,629

(22) Filed: May 15, 2013

(65) Prior Publication Data
US 2014/0338864 A1 Nov. 20, 2014

(51) Int. Cl.
*H02K 9/19* (2006.01)
*F01P 7/14* (2006.01)
*F02B 61/04* (2006.01)
*F02B 63/04* (2006.01)
(Continued)

(52) U.S. Cl.
CPC ... *H02K 9/19* (2013.01); *F01P 7/14* (2013.01); *F02B 61/04* (2013.01); *F02D 41/0245* (2013.01); *F01P 2060/00* (2013.01); *F01P 2060/185* (2013.01); *F02B 63/04* (2013.01); *F02D 29/06* (2013.01); *F02D 2041/026* (2013.01); *Y02T 10/26* (2013.01)

(58) Field of Classification Search
CPC .. F02D 41/0245; F01P 7/14; F01P 2060/185; H02K 9/19; F02B 61/04
See application file for complete search history.

(56) References Cited

U.S. PATENT DOCUMENTS 2,633,541 A * 3/1953 Justus ............... B60L 7/02
290/14
5,565,716 A * 10/1996 Tierney, Jr. ............ G01R 1/203
307/149
(Continued)

FOREIGN PATENT DOCUMENTS

CN 1550367 12/2004
DE 19925100 A1 12/2000
(Continued)

OTHER PUBLICATIONS

"European Application Serial No. 14157832.8, European Search Report mailed Feb. 10, 2015", 6 pgs.
(Continued)

*Primary Examiner* — Tulsidas C Patel
*Assistant Examiner* — Viet Nguyen
(74) *Attorney, Agent, or Firm* — Schwegman, Lundberg & Woessner, P.A.

(57) ABSTRACT

A power generation system that may include a generator having an alternator and an internal combustion engine configured to drive the alternator to generate power. The alternator may convert the mechanical energy created by the engine to electrical energy, such as alternating current. The generator may supply the electrical energy from the alternator to various devices which may be connected with the alternator. The power generation system may further include a load bank. The load bank may include one or more resistive elements, inductive elements, capacitive elements, or combinations of elements. The power generation system may include a cooling system that may remove heat from one or both the internal combustion engine and the load bank. The cooling system may include a liquid that passes through various components of the internal combustion engine to transfer the heat to or from the engine and the load bank.

11 Claims, 4 Drawing Sheets

(51) Int. Cl.
*F02D 41/02* (2006.01)
*F02D 29/06* (2006.01)

(56) References Cited

U.S. PATENT DOCUMENTS

| | | | |
|---|---|---|---|
| 5,949,247 A | 9/1999 | Lima et al. | |
| 6,407,690 B1 | 6/2002 | Yamamoto et al. | |
| 6,993,923 B2 | 2/2006 | Beers | |
| 7,044,096 B2* | 5/2006 | Foesel | B60L 1/02 123/142.5 E |
| 7,073,335 B2* | 7/2006 | Gerdes | F01D 15/10 290/52 |
| 7,367,179 B2* | 5/2008 | Frank | F01N 3/2006 123/142.5 E |
| 8,108,162 B2 | 1/2012 | Matsumoto | |
| 8,847,524 B2* | 9/2014 | Mazumdar | B60L 1/02 105/35 |
| 2004/0222639 A1* | 11/2004 | Turner | B60K 6/26 290/3 |
| 2005/0072174 A1* | 4/2005 | Beers | B63J 2/04 62/228.1 |
| 2010/0288571 A1* | 11/2010 | Dewis | B60K 3/04 180/165 |
| 2011/0025059 A1* | 2/2011 | Helle | F03D 9/02 290/44 |
| 2012/0110386 A1 | 5/2012 | Hancock et al. | |
| 2012/0306201 A1* | 12/2012 | Sorensen | F03B 11/00 290/7 |

FOREIGN PATENT DOCUMENTS

| | | |
|---|---|---|
| DE | 102004045540 A1 | 3/2006 |
| EP | 1508682 A2 | 2/2005 |
| EP | 1508682 A3 | 4/2005 |

OTHER PUBLICATIONS

"Chinese Application No. 201410119472.9, Office Action mailed Jan. 28, 2016 (with English translation)", (Jan. 28, 2016), 11 pgs.

* cited by examiner

COOLING AND CONTROL OF A LOAD BANK USED IN A POWER GENERATION SYSTEM

TECHNICAL FIELD

This disclosure generally relates to a power generation system, and more specifically relates to cooling and control of a load bank used in a power generation system.

BACKGROUND

Electronic and engine-driven devices are increasingly used and relied for performing countless tasks in all environments. In many cases, an engine or engine-driven generator may provide electrical or mechanical power to run such electronic and engine-driven devices. For example, in a marine setting where no utility power is available, a generator having an internal combustion engine connected with an alternator may be operated and provide power to various electronic devices aboard the ship or vessel.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
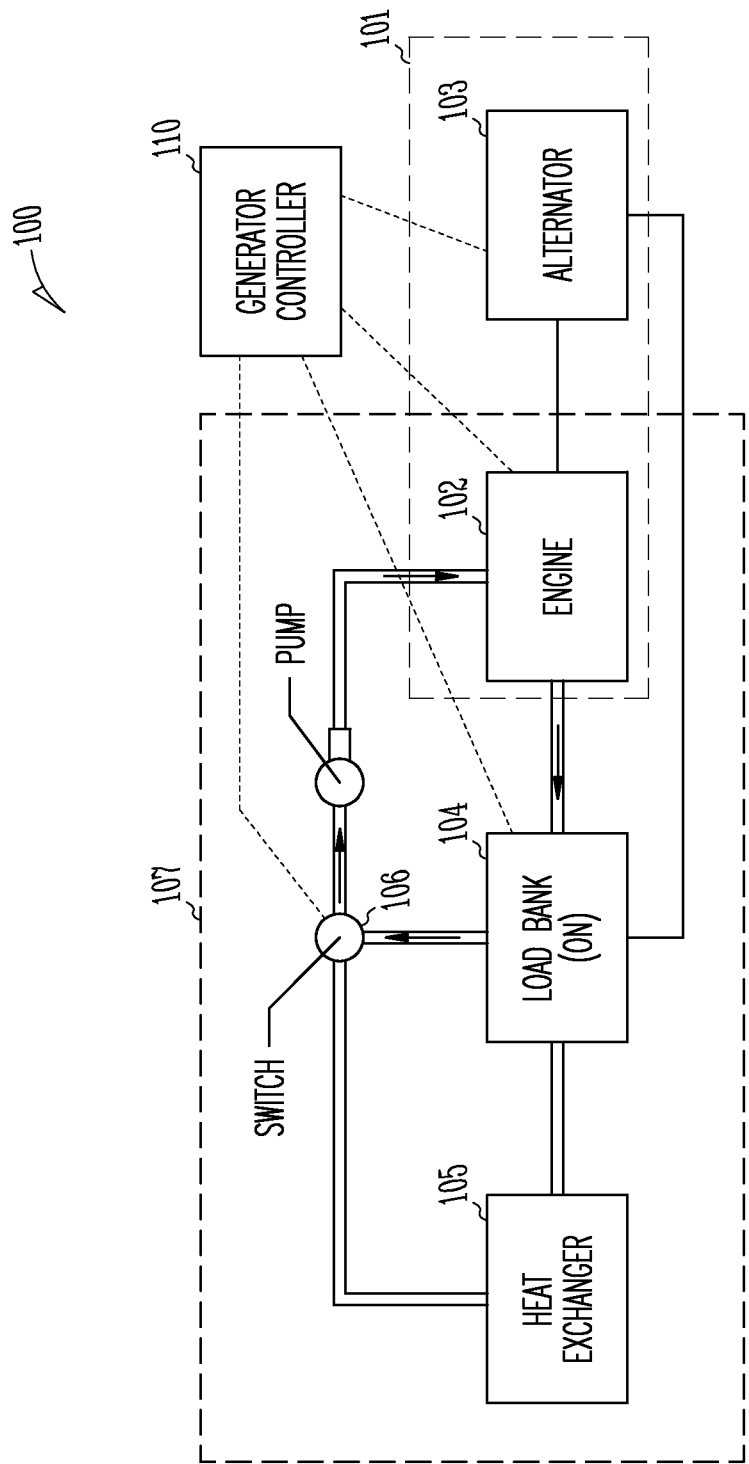
FIG. 1 is an example power generation system operating in a warm-up mode.
Figure 3:
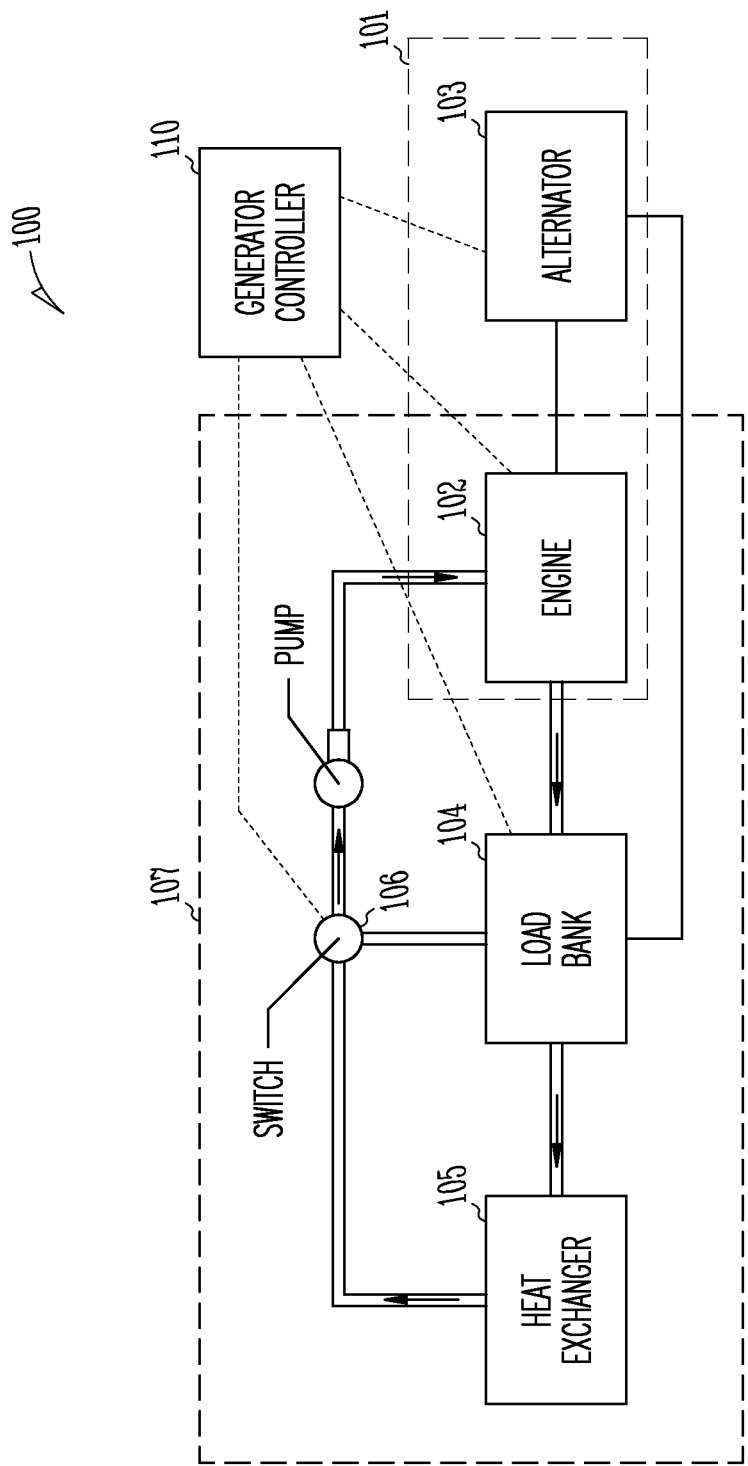
FIG. 3 is an example power generation system operating in a low load mode.
Figure 5:
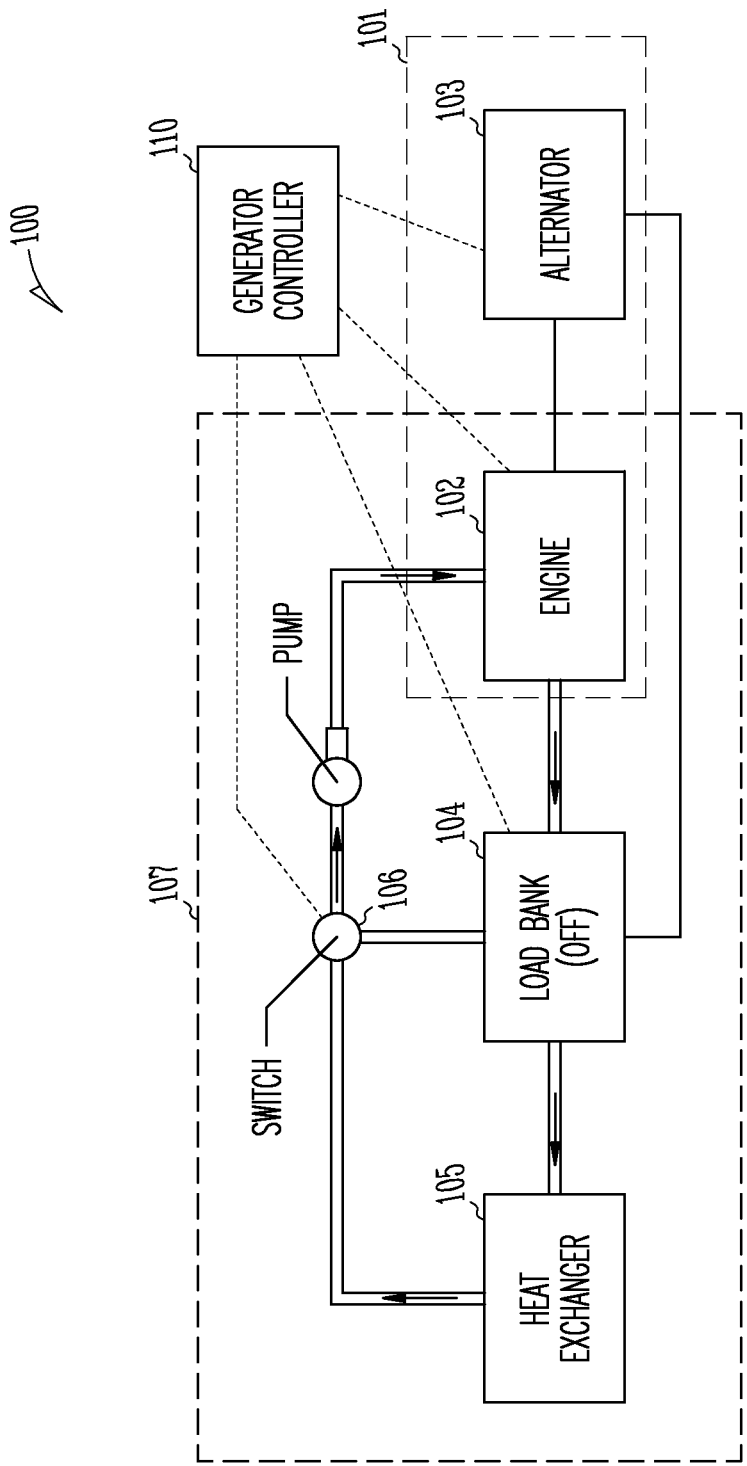
FIG. 5 is an example power generation system operating in a high load mode.

FIGS. 1, 3 and 5 are examples of a power generation system 100. The power generation system 100 may include a generator 101 that includes an alternator 103 and an internal combustion engine 102 configured to drive the alternator 103 to generate power. The internal combustion engine 102 may be powered by a fuel or resource, such as natural gas, diesel fuel, propane, gasoline, or various other fuels. The engine 102 may produce mechanical energy when operated. The alternator 103 may include or use a rotating magnetic field with a stationary armature, a rotating armature with a stationary magnetic field, or a linear alternator (among other types of alternators). The alternator 103 may convert the mechanical energy created by the engine 105 to electrical energy, such as alternating current. The generator 101 may supply the electrical energy from the alternator 103 to various devices which may be connected with the alternator 103. In other systems, the power generation system 100 may include various other components and may generate electrical energy or power in various other ways.

The power generation system 100 may further include a load bank 104. The load bank 104 may be an electrical load bank. The load bank 104 may include one or more resistive elements, inductive elements, capacitive elements, or combinations of elements. Other types of load banks may also or alternatively be included in the power generation system 100. The load bank 104 may selectively absorb power from the generator 101. For example, an electric load bank may be formed of resistive elements that absorb power supplied by the generator 101 and dissipate the power as heat. Other variations are possible.

Generators may be connected to the load bank 104 for various reasons, such as to meet regulatory standards that relate to operating the generator 101 according to an exercise schedule. The load bank 104 may be used to ensure that the generator 101 reaches an operating temperature during the exercise and is capable of supplying power in the event of an outage. Generator 101 may be connected to the load bank 104 to increase engine exhaust temperature in order to avoid undesirable build-up of unburned fuel in the engine exhaust system. This undesirable build-up of unburned fuel in the engine exhaust system is commonly referred to as "wet-stacking" and increases the risk of uncontrolled fire or explosion within the engine exhaust system.

During operation of the power generation system 100, the internal combustion engine 102 may generate a significant amount of heat. The amount of heat generated may depend on the environment where the power generation system 100 is located, and/or the power output of the generator 101. It may be desirable to maintain the operating temperature of the internal combustion engine 102 with a determined range, such as to (i) protect the components that form the internal combustion engine 102 from temperature-related damage; and/or (ii) provide sufficient activation energy for efficient combustion within the engine 102.

In some instances, part or all of the heat that is generated by the internal combustion engine 102 may have to be removed from the internal combustion engine 102 to maintain the operating temperature of the internal combustion engine 102 within an optimal or determined range. When the load bank 104 is used to provide an electrical load to the generator 101, the load bank 104 may also generate a significant amount of heat. In order to avoid temperature-related damage to the elements of the load bank 104, part or all of the heat generated by the load bank 104 may have to be removed from the load bank 104.

The power generation system 100 may include a cooling system 107 that may remove heat from one or both the internal combustion engine 102 and the load bank 104. The cooling system 107 may include heat exchanger 105, a switch 106 (or multiple switches) and a cooling system liquid that passes through various components of the internal combustion engine 102 to transfer the heat to or from the components. As an example, the cooling system liquid may pass through the cylinder block of the internal combustion engine 102. As the cooling system liquid passes through the internal combustion engine 102, the cooling system liquid may absorb (receive and/or remove) heat from the internal combustion 102, cooling the internal combustion engine 102. In other examples, the cooling system liquid may be used to heat one or more components of the internal combustion engine 102, such as when the internal combustion engine is first started in a cold environment. The cooling system liquid may be water, an ethylene-glycol water mixture, motor oil, or other liquids.

In some instances, the cooling system 107 may be used to maintain the components that form the internal combustion engine 102 within a desired temperature range.

The cooling system may remove heat from the internal combustion engine 102 and/or the load bank 104 at various rates. For example, depending on the environment where the power generation system 100 is located, and the amount of electrical load that is applied to the generator 101 by the load bank 104, the cooling system 107 may have sufficient cooling capacity to remove heat at a rate which is equal to sum of the heat generation rates of the internal combustion engine 102 and the load bank 104. In such systems, the cooling system 107 may thus maintain a constant operating temperature for the generator 101.

As an example, the cooling system liquid may flow past the outer surface of any resistive elements that are included in the load bank 104. The cooling system liquid may directly or indirectly contact such resistive elements. As an example of indirect contact, there may be an electrically insulating, thermally conductive layer between the resistive element and the cooling system liquid.

In some power generation systems 100, the cooling system 107 may further include a heat exchanger 105. The heat exchanger 105 may remove heat from, and thus cool, the cooling system liquid. Once the heat exchanger 105 removes heat from the cooling system liquid, the cooled liquid may then be recirculated through the cooling system 107 to again remove heat from the internal combustion engine 102 and/or the load bank 104. This cycle may be repeated continuously or when desired.

The heat exchanger 105 may be able to remove heat at a sufficient rate from the cooling system liquid during all operating modes of the power generation system 100. As an example, the heat exchanger 105 may be a radiator that removes heat from the cooling system liquid when it is within the radiator. The heat may be removed from the radiator by utilizing a fan to force cooling air through the radiator.

As another example, the heat exchanger 105 may be a liquid-to-liquid heat exchanger. The liquid-to-liquid head exchanger 105 may pass a different lower temperature liquid through some portions of the heat exchanger 105 in order to transfer heat from the cooling system liquid that passes through a first portion of the heat exchanger 105 to the different lower temperature liquid that passes through a second portion of the heat exchanger 105. One example application would be where the power generation system 100 is used in a marine application such that sea water (fresh water or salt water which is supporting the vessel) is used as the lower temperature cooling fluid in the heat exchanger 105. The heat exchanger 105 may alternatively be of any other type, size, or configuration.

In some power generation systems 100, the power generation system 100 may further include a generator controller 110. As an example, the generator controller 110 may selectively operate and protect the generator 101. The generator controller 110 may be separate from, or part of, other controller(s) that are used to control the cooling system 107.

The generator controller 110 may include hardware, software, firmware, or a combination. The generator controller 110 may include or access logic or instructions stored in a computer readable medium. The generator controller 110 may include a processor or processing component that may execute logic or instructions that are stored in the computer readable medium.

In some power generation systems 100, the generator controller 110 may control the load bank 104 to maintain a load on the generator 101. As an example, the load bank 104 may maintain a minimum load on the generator 101 in order to increase engine exhaust temperature and thereby decrease the likelihood of wet-stacking within the engine exhaust system. Other examples are possible.

The generator controller 110 may receive, monitor, and/or measure a characteristic of the generator 101, and may control the load bank 104 based on the characteristic. As an example, the characteristic may be an operating state of the generator 101 (i.e., whether the generator is providing emergency standby power). As another example, the characteristic may be an output power supplied by the generator 101.

In some power generation systems 100, various types of sensors may be used to measure one or more characteristics. As an example, the sensor may be a temperature sensor and may measure a temperature of a component, input, or output of the generator 101. Some example temperature sensors may include a coolant temperature sensor, an oil temperature sensor, an exhaust temperature sensor, an engine temperature sensor, an enclosure temperature sensor, an external temperature sensor and/or a sensor that measures stator winding temperature of the alternator 103 or various other temperature sensors. Sensor types include thermocouples, resistance temperature detectors and/or thermistors (among other temperature sensor types).

The sensor may alternatively be a different type of sensor and may measure a characteristic other than temperature. For example, the sensor may be an oil pressure sensor and may be configured to measure the oil pressure of the internal combustion engine 102. As another example, the sensor may be a chemical or compositions sensor. The sensor may be a sensor configured to measure moisture content of the oil of the engine. The sensor may be a viscosity sensor configured to measure a viscosity of the engine 102 oil. In some power generation systems 100, multiple sensors of different types or measuring different characteristics may be used.

The generator controller 110 may add or subtract elements of the load bank 104 based on the characteristic. For example, the generator controller 110 may add or subtract elements of the load bank 104 to ensure that the output power of the generator 101 remains above a minimum power output. Other variations are possible.

In some power generation systems 100, the cooling system 107 may be configured to operate in at least three operating modes. FIGS. 1-6 illustrate three example operating modes for the cooling system 107, though other operating modes are possible.

Figure 2:
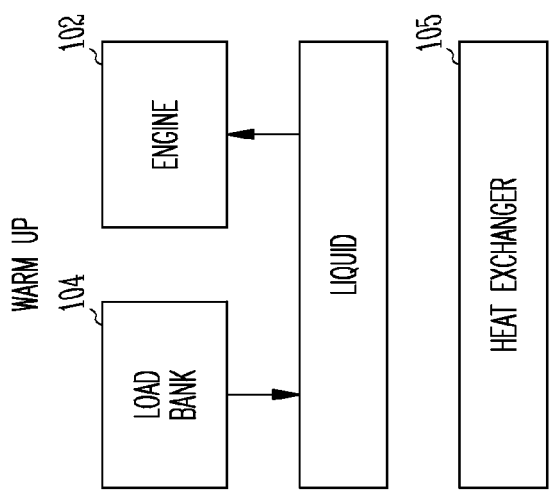
FIG. 2 is schematic view of the heat transfer taking place within the cooling system of the power generation system shown in FIG. 1.

FIGS. 1-2 illustrate a warm up mode of operation for the cooling system 107. The system may operate in the warm up mode when the temperature of the internal combustion engine 102 is below a nominal operating temperature. Because an internal combustion engine 102 may operate less efficiently when operated below a nominal operating temperature, it may be useful to use the cooling system 107 to increase the speed with which the internal combustion engine 102 warms up.

As such, in the warm up mode, the cooling system liquid may receive heat from the load bank 104 and supply heat to the internal combustion engine 102 without the cooling system liquid engaging the heat exchanger 105. During operation of the cooling system 107 in the warm up mode, the load bank 104 is effectively used to provide heat to the internal combustion engine 102. The cooling system 107 may be configured to include a switch 106 so that the liquid bypasses the heat exchanger 105 (as shown in FIG. 1), or passes through a non-operating heat exchanger 105.

Figure 4:
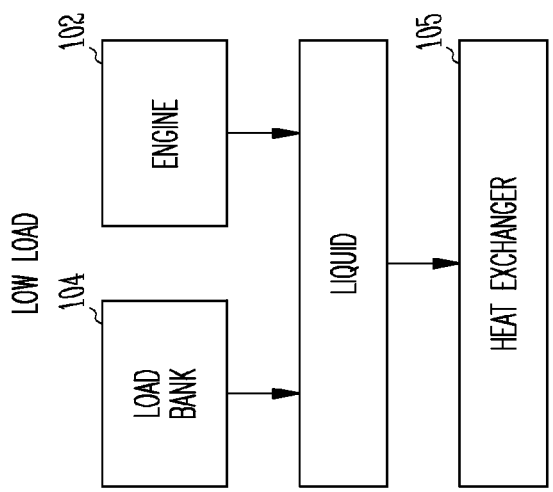
FIG. 4 is schematic view of the heat transfer taking place within the cooling system of the power generation system shown in FIG. 3.

FIGS. 3-4 illustrate the low load mode of operation for the cooling system 107. The system may operate in the low load mode when the power which the generator 101 is providing is below a minimum power output, such as to avoid wet stacking.

In the low load mode, the cooling system liquid may receive heat from the load bank 104 and the internal combustion engine 102. The heat exchanger 105 may absorb heat from the cooling system liquid to maintain the generator 101 within a safe operating temperature range.

During operation of the cooling system 107 in the low load mode, the heat exchanger 105 may effectively be used to remove heat from the load bank 104 and the internal combustion engine 102. As an example, the heat rejected to the cooling system 107 by the internal combustion engine 102 may be approximately one-third of the total heat generated by the power generation system 100. The heat rejected to the combustion exhaust air by the internal combustion engine 102 may be approximately one-third of the total heat generated by the power generation system 100. The power produced by the internal combustion engine 102 may be approximately one-third of the total heat generated by the power generation system 100.

When the generator 101 is supplying full rated power to an external load, the cooling system 107 may remove heat at a rate that is approximately equal to the full rated power of the generator 101. The combustion exhaust air may remove heat at a rate that is approximately equal to the full rated power of the generator 101. When the minimum power output threshold to avoid wet stacking is below approximately half of the rated power of the generator 101, the cooling system 107 may remove heat at a rate below the full rated power of the generator 101 because the cooling system 107 is removing heat at a rate that is approximately equal to the sum of the rate of heat that is generated by the load bank 104 and the rate of heat that is generated by the internal combustion engine 102.

Figure 6:
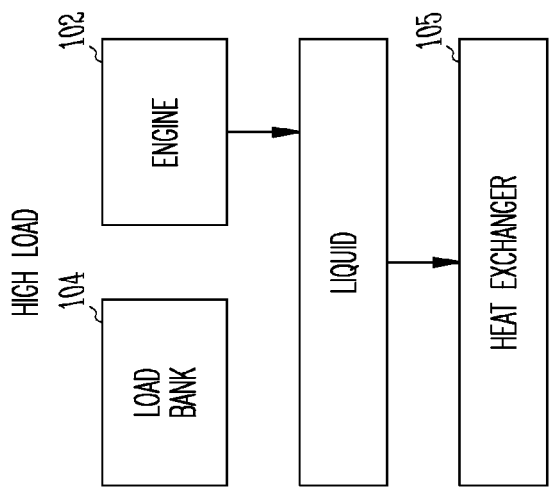
FIG. 6 is schematic view of the heat transfer taking place within the cooling system of the power generation system shown in FIG. 5.

FIGS. 5-6 illustrate a high load mode of operation of the cooling system 107. The system may operate in the high load mode when the generator 101 is providing power greater than a power output threshold, such as a minimum power output threshold to avoid wet stacking.

In the high load mode, the load bank 104 may not be used by the system. Rather, the cooling system liquid may receive heat from internal combustion engine 102 and supply heat to the heat exchanger 105. During operation of the cooling system 107 in the high load mode, the heat exchanger 105 may be effectively used to remove heat from just the internal combustion engine 102 as long as the load bank 104 is not operating. The cooling system 107 may be configured so that the cooling system liquid passes through a non-operating load bank 104 (as shown in FIG. 3), or bypass the load bank 104 altogether.

In some systems, when the cooling system 107 operates in high load mode, the heat rejected to the cooling system 107 by the power generation system 100 may be effectively equivalent to the heat rejected to the cooling system 107 by power generation systems that do not include a load bank 104. In such systems, the cooling system 107 requirements for the power generation system 100 may not be any different than conventional power generation systems even though a load bank 104 is included in the power generation system 100.

The generator controller 110 may control a mode of operation for the cooling system 107. The generator controller 110 may additionally or alternatively determine specifications for operating the generator 101 in the warm up mode, low load mode, or the high load mode. The generator controller 110 may additionally or alternatively instruct the power generation system 100 to operate the cooling system 107 in a particular mode according to the determined specifications. As an example, the generator controller 110 may determine and control when the cooling system 107 should transition from one mode (such as the warm up mode) to another mode (such as the low or high load mode).

The generator controller 110 may communicate with, and use information from various sensors in determining the specifications for operating the cooling system 107 in a particular mode. The sensors may communicate information to the generator controller 110 in various ways, such as through a bus, wired communication line, wirelessly, or in various other ways. In some systems, the sensor may be directly coupled to an input of the generator controller 110. In other systems, the sensor may communicate a measured characteristic to the generator controller 110 indirectly, such as by or through a separate control module.

The generator controller 110 may receive the information from the sensor continuously, periodically, at intervals, upon request, when triggered by an event, randomly, or at various other times. The generator controller 110 may control the sensor to control power to the sensor or request data. Other examples are possible.

The generator controller 110 may send a signal or instructions to the various components of the power generation system 100 to operate according to determined specifications. In other examples, the generator controller 110 may not directly instruct a component to operate according to the determined specifications, but may instead instruct an intermediary component, such as an engine control unit, to operate the desired component (such as the internal combustion engine 102). Other variations and examples are possible.

The power generation system 100 may include, or be connected with, a user interface or display. The display may provide a visual or audible indicator to a user. This may be useful where a user wishes to monitor conditions that effect generator operation, or where the user may wish to select an operating mode for the cooling system 107. As an example, the display may provide information about the cooling system 107, information about the operation of power generation system 100 such as its operating history and its present operating conditions, information about a load, or various other information. Other examples are possible.

The methods, devices, and logic described above may be implemented in many different ways in many different combinations of hardware, software or both hardware and software. For example, all or parts power generation system 100, such as the generator controller 110, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A power generation system comprising:
   a generator that includes an alternator and an internal combustion engine that drives the alternator to generate power;
   a load bank configured to selectively absorb power from the generator;
   a cooling system that includes a liquid, the cooling system configured to operate in a plurality of operating modes; and
   a controller that manipulates the liquid in the cooling system based on the operating mode of the cooling system, where the operating modes include a warm-up mode, a low load mode and a high load mode;
   where the liquid receives heat from the load bank and supplies heat to the engine in the warm up mode;
   where the liquid receives heat from the load bank, receives heat from engine and supplies heat to a heat exchanger in the low load mode; and
   where the liquid receives heat from engine and supplies heat to the heat exchanger in the high load mode without receiving heat from the load bank.

2. The power generation system of claim 1, further comprising a switch for controlling a flow of the liquid through the heat exchanger.

3. The power generation system of claim 1, where the controller is a generator controller that selectively operates and protects the generator, and where the generator controller is configured to control the load bank to maintain a load on the generator.

4. The power generation system of claim 3, where the generator controller measures a characteristic of the generator and controls the load bank based on the characteristic.

5. The power generation system of claim 4, where the characteristic is an operating state of the generator.

6. The power generation system of claim 4, where the characteristic is a temperature of a component of the internal combustion engine.

7. The power generation system of claim 1, where the liquid is an ethylene-glycol water mixture.

8. The power generation system of claim 1, where the load bank includes resistive elements.

9. The power generation system of claim 1, where the heat exchanger is a radiator.

10. The power generation system of claim 1, where the heat exchanger is a liquid-to-liquid heat exchanger.

11. The power generation system of claim 10, where the liquid-to-liquid heat exchanger is configured to exchange heat between the liquid and sea water.

* * * * *